United States Patent

Stuckart

(10) Patent No.: US 6,435,068 B1
(45) Date of Patent: Aug. 20, 2002

(54) CUTTING MECHANISM WITH FLOATING SPRING-BIASED BLADE

(75) Inventor: Thomas A. Stuckart, Three Lakes, WI (US)

(73) Assignee: Lakes Precision Inc., Three Lakes, WI (US)

( * ) Notice: Subject to any disclaimer, the term of this patent is extended or adjusted under 35 U.S.C. 154(b) by 0 days.

(21) Appl. No.: 09/398,605

(22) Filed: Sep. 17, 1999

(51) Int. Cl.⁷ ............................................... B26D 5/08
(52) U.S. Cl. ..................... 83/583; 83/699.11; 83/581.1; 83/694
(58) Field of Search ................... 83/583, 582, 581.1, 83/699.11, 699.31, 699.51, 694

(56) References Cited

U.S. PATENT DOCUMENTS

| | | | | |
|---|---|---|---|---|
| 2,397,048 A | * | 3/1946 | Roop | 83/583 |
| 3,793,919 A | * | 2/1974 | Lefebvre | 83/583 |
| 4,416,176 A | * | 11/1983 | Forthmann | 83/582 |
| 4,819,533 A | | 4/1989 | Wollermann et al. | 83/154 |
| 4,866,970 A | * | 9/1989 | Castiglioni | 72/337 |
| 5,107,735 A | * | 4/1992 | Ramun et al. | 83/407 |
| 5,630,341 A | * | 5/1997 | Hoffa | 81/9.51 |
| 5,640,891 A | * | 6/1997 | Hoffa | 83/155 |
| 5,653,016 A | * | 8/1997 | Hoffa | 29/825 |
| 5,832,964 A | * | 11/1998 | Joshi | 83/582 |
| 5,934,161 A | | 8/1999 | Keene | 81/9.51 |
| 6,095,907 A | * | 8/2000 | Greenman et al. | 451/162 |

OTHER PUBLICATIONS

"Programmable Fiber Optic Cable Stripping Machine", FO 7045, Schleuniger brochure.

* cited by examiner

Primary Examiner—M. Rachuba
Assistant Examiner—Kim Ngoc Tran
(74) Attorney, Agent, or Firm—Andrus, Sceales, Starke & Sawall, LLP

(57) ABSTRACT

A mechanism for cutting an elongated material, such as insulated wire or fiber optic cabling. The cutting mechanism includes a stationary blade housing that includes a recessed blade receptacle. The blade receptacle receives an insert blade that is biased outward by a bias element. A cutting blade having a pair of guide legs is movable relative to the stationary blade housing and insert blade such that a cutting edge of the cutting blade interacts with a cutting edge of the insert blade to sever the elongated material. The cutting blade is received within a blade guideway formed between the blade housing and an attached guide block. The blade guideway guides the movement of the cutting blade between its retracted position and its extended position. As the cutting blade moves to the extended position, the guide legs of the cutting blade contact an outer face surface of the insert blade such that the insert blade and the cutting blade retain the desired orientation. The bias element forces the insert blade into contact with the moving cutting blade to maintain the proper orientation between the cutting edge on each of the components.

14 Claims, 3 Drawing Sheets

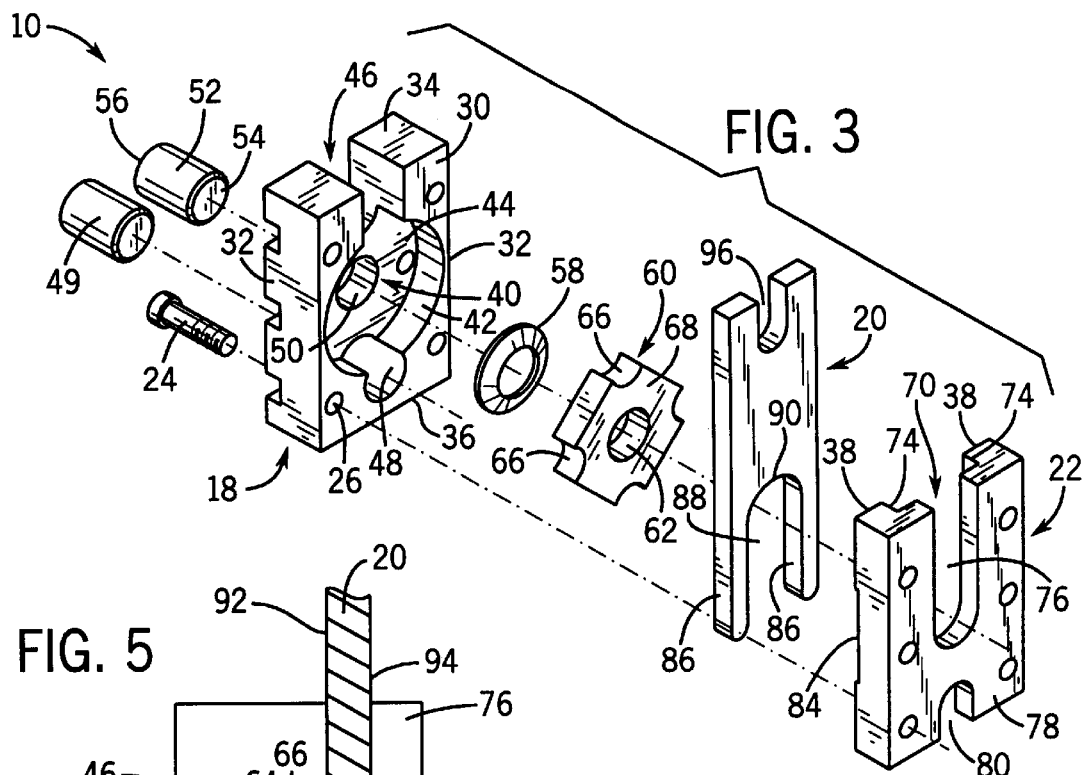
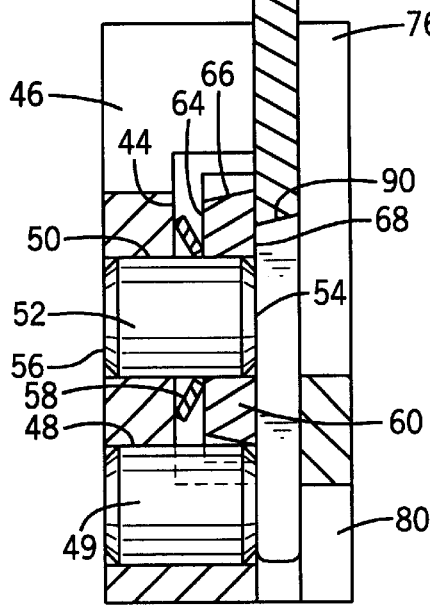
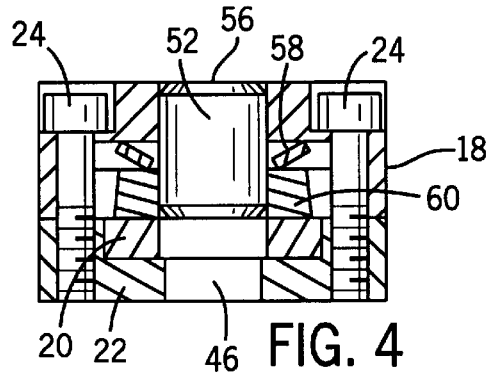
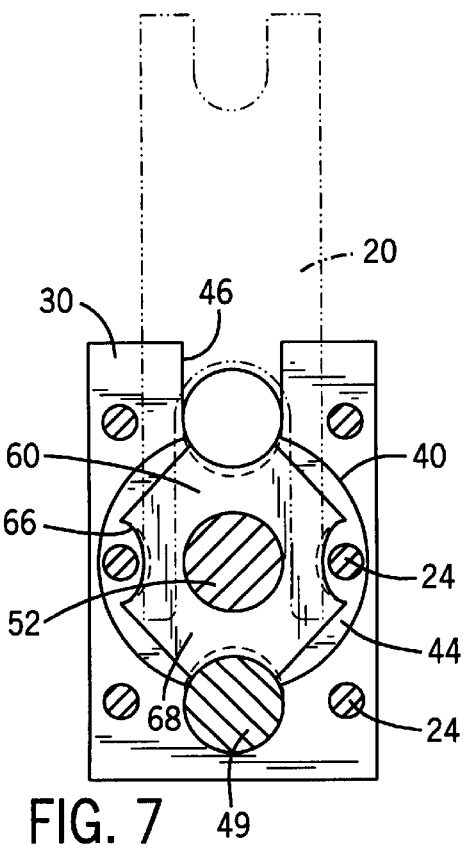

CUTTING MECHANISM WITH FLOATING SPRING-BIASED BLADE

BACKGROUND OF THE INVENTION

The present invention generally relates to a cutting mechanism for severing a continuous piece of elongated material. More specifically, the present invention is a cutting mechanism including a floating insert blade that interacts with a reciprocal cutting blade to ensure the proper orientation between the blades such that the cutting mechanism is particularly useful in severing fiber optic cables.

Currently available cutting mechanisms used to sever lengths of electrical wiring typically include either bypass blades or collinear blades. Although both of these types of cutting blades are useful in severing electrical wiring that includes a metallic conductor surrounded by a layer of insulation, problems exist when utilizing either of the cutting mechanisms to cut a length of fiber optic cable. Specifically, both bypass cutting blades and collinear cutting blades have problems cutting fiber optic cable that includes a layer of Kevlar strands to protect the internal fiber optic strand.

Typical bypass blades include a pair of cutting blades that each include a cuffing edge. The bypass blades are operated such that the cutting edge of each blade approaches and passes the opposed cutting edge to sever the material positioned therebetween in a guillotine-type fashion. When bypass blades are used to cut fiber optic cables, any gap between the cutting edge on the opposed blades can allow the Kevlar strands to pass between the blades and remain uncut after the process has been completed.

A cutting mechanism including collinear blades includes two blades contained in a common plane that abut each other to sever the material between the two cutting edges. During repeated use of the collinear blades, the cutting edge of each blade becomes worn, such that the cooperating blades will have trouble cutting the small, individual Kevlar strands contained in the fiber optic cable.

In general, the problem in cutting the fiber optic cable including the layer of Kevlar fibers resides in the tight tolerances that must be maintained between the cutting edges of the cutting blades. If the cutting edges of the cutting blades are not maintained in nearly perfect alignment, the Kevlar fibers remain uncut and create an undesirable result.

Therefore, it is an object of the present invention to provide a cutting mechanism that can be used to cleanly cut a fiber optic cable including a layer of Kevlar strands. Additionally, it is an object of the present invention to provide a cutting mechanism that includes wear-resistant cutting blades to reduce wear during repeated use of the cutting mechanism with a fiber optic cable. Further, it is an object of the present invention to provide cutting blades that can be readily replaced or rotated.

SUMMARY OF THE INVENTION

The present invention is directed to a cutting mechanism used to sever an elongated material. In particular, the cutting mechanism of the invention is particularly useful in cutting a fiber optic cable including a layer of Kevlar strands.

The cutting mechanism includes a cutting blade and an insert blade that each include a cutting edge. The movement of the cutting blade past the insert blade severs the elongated material in the desired manner. The insert blade is mounted within a blade receptacle formed in a stationary mounting block. The blade receptacle is defined by an inner surface recessed from an attachment surface of the blade housing by a sidewall. A bias member is positioned between the insert blade and the inner surface of the blade receptacle to urge a generally planar outer surface of the insert blade outward past the attachment surface of the blade housing.

A guide block is securely attached to the blade housing. Specifically, a pair of attachment strips formed on the guide block contact the attachment surface of the blade housing when the guide block is attached to the blade housing. A blade contact surface is formed on the guide block and is recessed from the attachment strips, such that when the guide block is attached to the blade housing, the recessed blade contact surface forms a blade guideway between the joined blade housing and guide block.

The blade guideway receives the cutting blade such that the cutting blade can reciprocate between a retracted position and an extended position relative to the stationary blade housing. The cutting blade includes a pair of spaced guide legs that extend from the cutting edge formed on the cutting blade. The guide legs are spaced by an open channel that is larger than the maximum diameter of elongated material to be cut by the cutting mechanism.

When an elongated material, such as a fiber optic cable, is inserted into the cutting mechanism, the elongated material passes completely through the cutting mechanism. Specifically, the material to be cut passes through a material-receiving opening contained in the blade housing, the open channel formed in the cutting blade, and an open slot formed in the guide block.

As the cutting blade moves from its retracted position to its extended position, the outer face surface of the insert blade initially comes into contact with a cutting face surface formed on each guide leg of the cutting blade. The interaction between the outer face surface of the insert blade and the cutting face surface on each guide leg causes the cutting edge on the insert blade and the cutting edge on the cutting blade to be properly aligned. The bias member positioned behind the insert blade ensures that the insert blade is held in the proper alignment relative to the cutting blade as the cutting blade moves to the extended position.

As a further feature of the invention, the insert blade includes multiple cutting edges such that the insert blade can be indexed upon each cutting edge becoming worn. Specifically, the insert blade includes four separate cutting edges such that the single insert blade can be used until each of the four cutting edges becomes worn. Preferably, both the insert blade and the cutting blade are formed from carbide to further reduce wear during repeated use of the cutting mechanism.

The combination of the guide block and the blade housing form the blade guideway that receives the cutting blade. The blade guideway supports the cutting blade in all directions to prevent the cutting blade from twisting while the cutting blade severs the fiber optic cable. However, even if slight twisting occurs, the bias force exerted by the bias element on the insert blade retains the desired orientation between the insert blade and the cutting blade to ensure a clean cut of the Kevlar fibers contained within the fiber optic cable.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is an exploded perspective view illustrating the cutting mechanism of the present invention;

FIG. 4 is a section view taken along line 4—4 of FIG. 2 illustrating the cutting mechanism of present invention;

FIG. 5 is a section view taken along line 5—5 of FIG. 2 illustrating the cutting mechanism of the present invention in the extended position;

FIG. 7 is a section view taken along line 7—7 of FIG. 1;

DETAILED DESCRIPTION OF THE INVENTION

Figure 1:
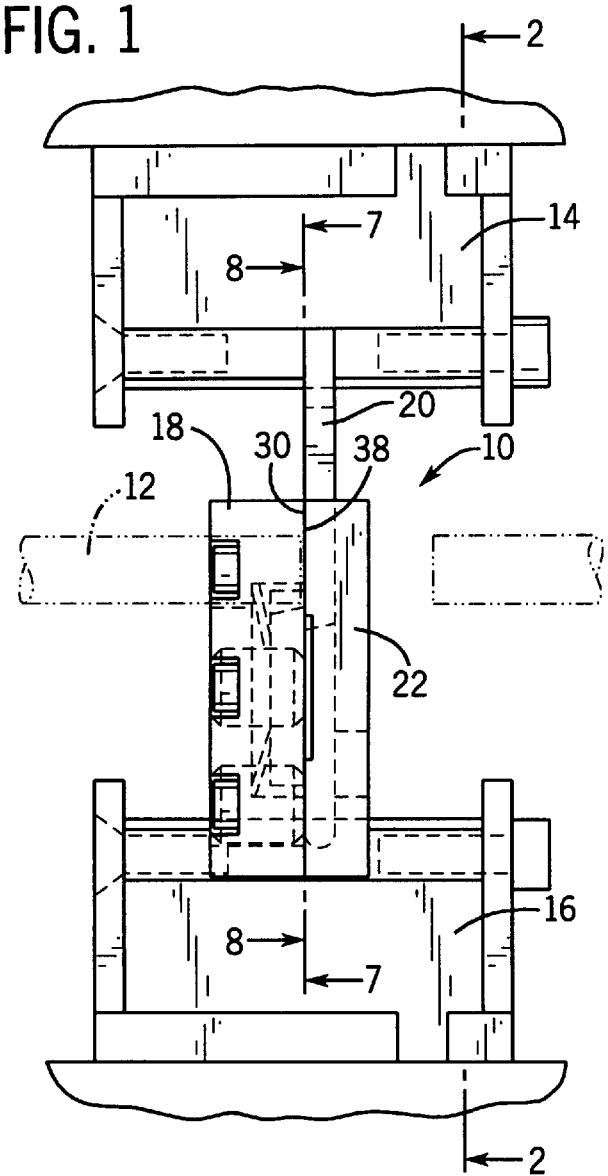
FIG. 1 is a side profile of a cutting mechanism of the present invention shown in its extended position severing an elongated material such as a fiber optic cable.

A cutting mechanism 10 of the present invention is generally shown in FIG. 1. The cutting mechanism 10 is operable to sever an elongated material 12, such as electrical wiring or fiber optic cabling. The cutting mechanism 10 is shown operatively mounted between an upper cutting head 14 and a lower cutting head 16 which are conventional components utilized in numerous prior art wire cutting and stripper systems, such as that shown in U.S. Pat. No. 5,934,161, hereby incorporated by reference. Specifically, the upper cutting head 14 and the lower cutting head 16 are movable toward and away from each other such that as the upper cutting head 14 is moved toward the lower cutting head 16, the elongated material 12 is severed by the cutting mechanism 10 in the manner to be discussed in greater detail below.

Referring now to FIG. 3, the cutting mechanism 10 includes a blade housing 18, a cutting blade 20 and a guide block 22. In the operative condition, the blade housing 18 is joined to the guide block 22 by a series of cap head screws 24 that each pass through an attachment opening 26 and are received within an internally threaded bore 28 formed in the guide block 22.

The blade housing 18 includes a generally planar attachment surface 30 extending between a pair of spaced, generally planar side surfaces 32, a planar top surface 34, and a bottom surface 36. When the blade housing 18 is connected to the guide block 22 by the plurality of cap head screws 24, the attachment surface 30 of the blade housing 18 is pressed into direct contact with a pair of spaced attachment strips 38 formed on the guide block 22.

The blade housing 18 includes a blade receptacle 40 that is recessed from the attachment surface 30. The blade receptacle 40 is defined by a sidewall 42 and a planar, inner surface 44. The inner surface 44 of the blade receptacle 40 is recessed from the attachment surface 30 by a depth defined by the sidewall 42. In the preferred embodiment of the invention shown in FIG. 3, the blade receptacle 40 is circular.

The blade housing 18 includes a material-receiving opening 46 that extends into the blade housing 18 from the top surface 34 and extends through the entire width of the blade housing 18. As can be seen in FIG. 7, the material-receiving opening 46 is generally U-shaped and is positioned adjacent to the top of the blade receptacle 40 and extends into the circular blade receptacle 40. The material-receiving opening 46 is open from the top and sized to allow the elongated material 12 of the desired diameter to pass through the blade housing 18. In the preferred embodiment of the invention, the width of the material-receiving opening 46 is approximately 0.312 inches such that conventional fiber optic cable can pass through the material-receiving opening 46.

In addition to the material-receiving opening 46, the blade housing 18 includes a pin receptacle 48 that extends through the entire width of the blade housing 18, as shown in FIGS. 3 and 7. The pin receptacle 48 receives a retaining pin 49. The retaining pin 49 is press fit into the pin receptacle 48 and extends into the blade receptacle 40, as best seen in FIG. 7.

A central opening 50 passes through the reduced thickness of the blade housing 18 at the center of the blade receptacle 40. The central opening 50 is sized to receive a support pin 52 that is press fit into the central opening 50. The support pin 52 includes an inner surface 54 that is generally flush with the attachment surface 30 of the guide block 18 and an outer face surface 56 that is flush with the outermost surface of the guide block 18, as best seen in FIG. 5.

As can be seen in FIGS. 3 and 5, a bias element 58 and an insert blade 60 are supported within the blade receptacle 40 by the support pin 52. Specifically, the bias element 58 is a Belleville washer that surrounds the outer diameter of the support pin 52 and contacts the inner surface 44 of the blade receptacle 40. The insert blade 60 includes a central opening 62 that receives the support pin 52 such that the bias element 58 is captured between inner face surface 64 of the insert blade 60 and the inner surface 44 of the blade receptacle 40, as best shown in FIG. 5.

The insert blade 60 is a generally square element having notches removed from each corner to define a plurality of cutting edges 66. As can be seen in FIG. 5, each cutting edge 66 is angled from an outer face surface 68 of the insert blade 60 to the inner face surface 64. In the preferred embodiment of the invention, the insert blade 60 is formed from tungsten carbide such that each of the cutting edges 66 is formed from the durable carbide material to resist wear during repeated use.

When the bias element 58 and insert blade 60 are positioned in the blade receptacle 40 and supported by the support pin 52, the combined width of the insert blade 60 and bias element 58 in the unstressed condition causes the outer face surface 68 of the insert blade 60 to extend outward past the attachment surface 30 of the blade housing 18. When the insert blade 60 is mounted around the support pin 52, the uppermost cutting edge 66 is generally aligned with the bottom of the material-receiving opening 46, as best seen in FIG. 7. Although the insert blade 60 is rotatable about the shaft 54, the retaining pin 49 extends into the blade receptacle 40 and contacts the lowermost cutting edge 66 to prevent the insert blade 60 from rotating.

Figure 8:
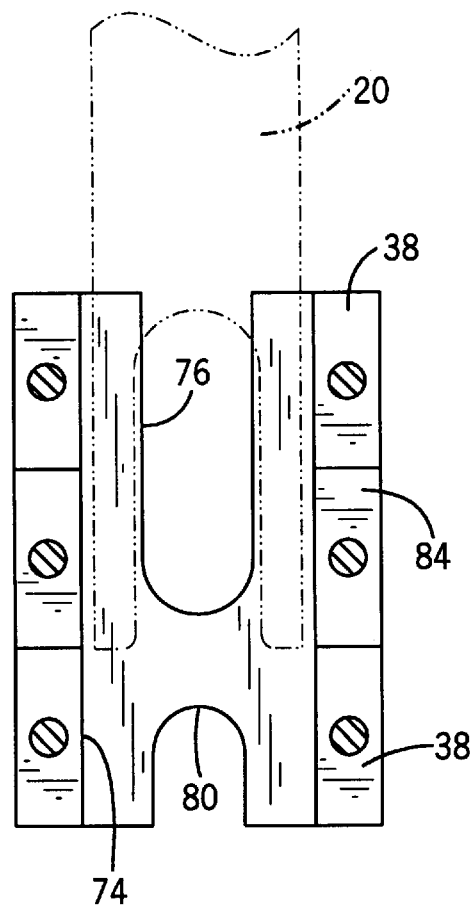
FIG. 8 a view taken along line 8—8 of FIG. 3.

Referring now to FIGS. 3 and 8, the guide block 22 includes the pair of attachment strips 38 contained in a common plane. The attachment strips 38 contact the attachment surface 30 of the blade housing 18 when the guide block 22 is attached to the blade housing 18. The attachment strips 38 are spaced from each other to define a blade guideway 70. The blade guideway 70 is a generally open slot defined by a blade contact surface 72 recessed from the attachment strips 38 by a pair of sidewalls 74. When the guide block 22 is attached to the blade housing 18, the blade guideway 70 defines an open channel extending between the top and bottom surfaces of the combined structure. In the preferred embodiment of the invention, the depth of the blade guideway 70 as defined by the sidewalls 74 is approximately .125 inches.

Figure 2:
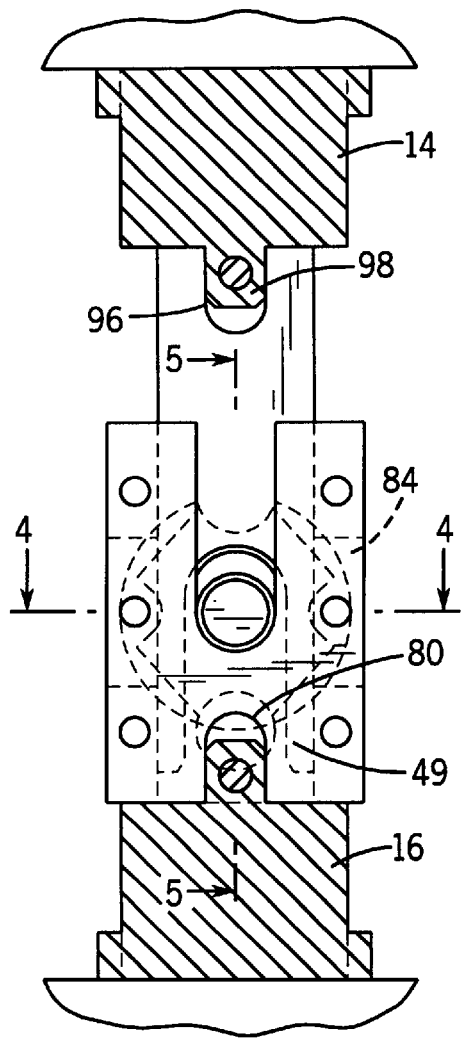
FIG. 2 is front view of the cutting mechanism of the present invention.
Figure 6:
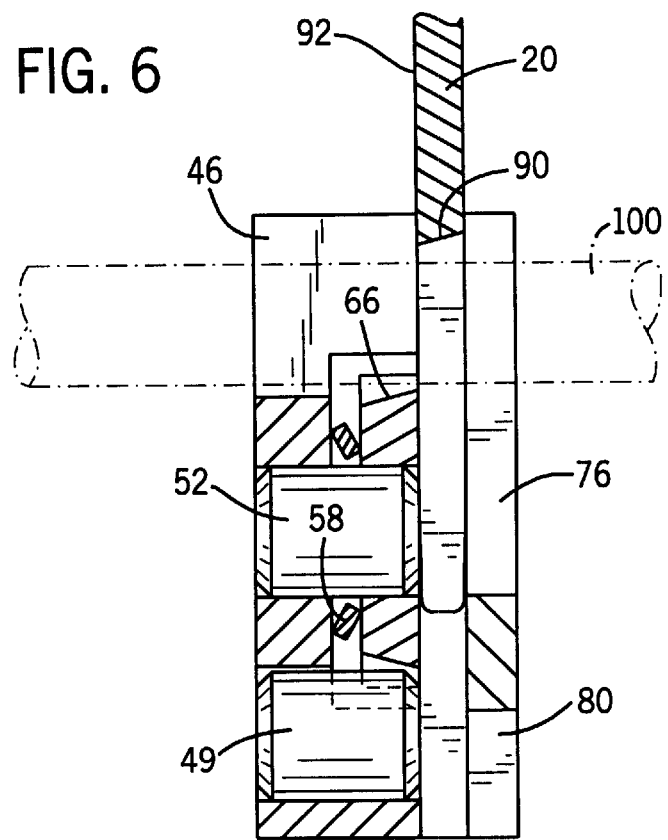
FIG. 6 is a section view similar to FIG. 5 illustrating the cutting mechanism prior to severing the fiber optic cable.

The guide block 22 includes an open slot 76 that extends through the entire width of the guide block 22 between the outer face surface 78 and the blade contact surface 72. The open slot 76 allows the length of elongated material 12, such as fiber optic cable, to pass through the guide block 22, as can be seen in FIG. 6. The guide block 22 includes an attachment notch 80 that receives the tab 49 contained on the lower cutting head 16, as best shown in FIG. 2.

Referring now to FIGS. 3 and 8, each attachment strip 38 includes an insert blade contact surface 84 that is recessed slightly from the remaining portions of the attachment strip 38. The insert blade contact surface 84 receives the outer face surface 68 of the insert blade 60 near the pair of the horizontally aligned cutting edges 66 contained on the insert blade 60 when the blade housing 18 is attached to the guide block 22. In this manner, the outer face surface 68 of the insert blade 60 extends slightly past the attachment surface 30 of the blade housing 18 when the guide block 22 is attached to the blade housing 18, the significance of which will be discussed in greater detail below. In the preferred embodiment of the invention, the insert blade contact surface 84 is recessed approximately .005 inches from the attachment strips 38.

The cutting mechanism 10 further includes the cutting blade 20. The cutting blade 20 includes a pair of spaced guide legs 86 that are separated by an open channel 88. Each of the guide legs 86 extends from the main body of the cutting blade 20 and are joined to each other by a curved cutting edge 90. As can be seen in FIG. 5, the cutting edge 90 is tapered from the cutting face surface 92 to the guide surface 94 of the cutting blade 20. The blade housing 18 includes an attachment notch 96 removed from its upper edge that receives a tab 98 formed on the upper cutting head 14, as shown in FIG. 2.

Referring back to FIG. 5, the overall thickness of the cutting blade 20 between the cutting face surface 92 and the guide surface 94 is slightly less than the depth of the blade guideway 70 formed in the guide block 22. Additionally, the width of the cutting blade 20 is slightly less than the width of the blade guideway 70 such that the blade guideway contacts the cutting blade 20 to resist twisting movement of the cutting blade 20. Thus, when the guide block 22 is secured to the blade housing 18, the cutting blade 20 can move within the blade guideway 70. In the preferred embodiment of the invention, the cutting blade 20 is formed from tungsten carbide such that the cutting edge 90 is a durable surface that can resist wear during repeated operation of the cutting mechanism 10.

Figure 9:
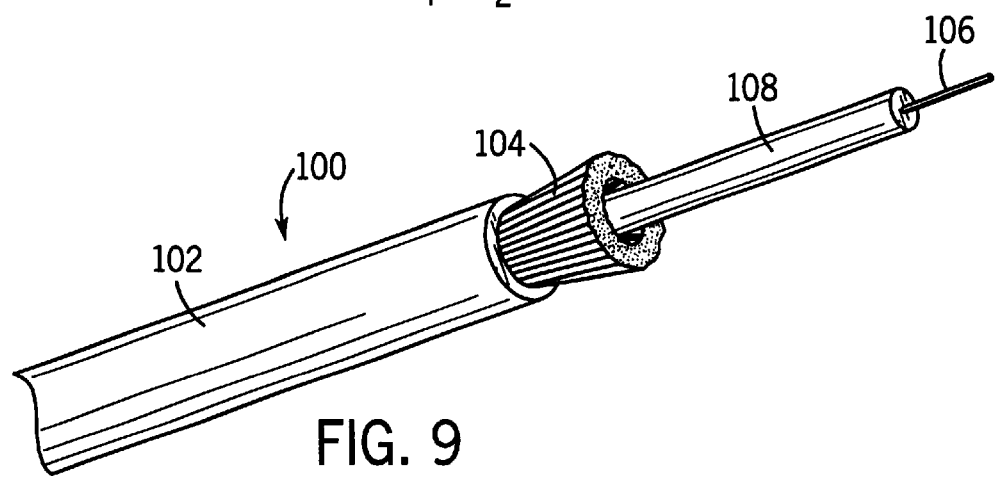
FIG. 9 is a partial perspective view of a typical fiber optic cable.

The operation of the cutting mechanism 10 of the present invention will now be discussed during the process of cutting a fiber optic cable, such as shown in FIG. 9. As shown in FIG. 9, the fiber optic cable 100 includes an outer jacket 102 that surrounds a protective layer of Kevlar fibers 104. The outer jacket 102 and the Kevlar fibers 104 provide protection for the strand of fiber optic material 106 contained in the center of the cable 100. In the embodiment shown in FIG. 8, the fiber optic strand 106 is also surrounded by a secondary coating 108 to further protect the fiber optic strand 106. Unlike normal wiring, the Kevlar fibers 104 in the fiber optic cable 100 provides a significant challenge during cutting since the individual fibers in the Kevlar layer 104 are often difficult to cut. Additionally, the fiber optic strand 106 increases the wear on the cutting blades due to the hardness of the glass compared to normal metallic wiring.

To utilize the cutting mechanism 10 of the present invention, the cutting blade 20 is initially mounted to the upper cutting head 14, while the joined blade housing 18 and guide block 22 are mounted to the lower cutting head 16. Prior to the cutting blade 20 being inserted into the blade guideway 70 formed between the blade housing 18 and the guide block 22, the bias element 58 forces the insert blade 60 outward past the attachment surface 30 and into contact with the recessed insert blade contact surface 84 of the guide block 22. As the cutting blade 20 is initially inserted into the blade guideway 70, the outer face surface 68 of the insert blade contacts the cutting face surface 92 of each guide leg 86 formed on the cutting blade 20 as shown in FIG. 7. In this manner, the bias element 58 exerts an outward bias force on the insert blade 60, which is supported on each side of the upper cutting edge 66 by the spaced guide legs 86. The bias element 58 allows the insert blade 60 "float" within the blade receptacle 40 and thus be held in aligned contact with the cutting face surface 92 of the cutting blade 20.

Once the cutting blade 20 has been inserted into the blade guideway 70, the cutting blade 20 is held in the retracted position shown in FIG. 6. When in the retracted position shown in FIG. 6, the fiber optic cable 100 can pass through the material-receiving opening 46 of the guide block 22, the open channel 88 of the cutting blade 20 and the open slot 76 formed in the guide block 22. The fiber optic cable 100 can be positioned such that the desired location for the cut can be adjusted by moving the fiber optic cable 100 longitudinally relative to the cutting mechanism 10.

Once the fiber optic cable 100 is in the desired position, the cutting blade 20 is moved from its retracted position to the fully extended position shown in FIG. 2. As the cutting blade 20 moves to the extended position, the cutting edge 90 on the cuffing blade 20 and the cutting edge 66 of the insert blade 60 sever the fiber optic cable 100, as can best be understood in FIG. 6. Since the insert blade 60 is forced into contact with the cutting face surface 92 of the pair of guide legs 86 by the bias element 58, the orientation of the cutting edges remains constant, regardless of any twisting occurring in the cutting blade 20. Therefore, the cutting edges are able to sever the small, individual strands of Kevlar in the fiber optic cable 100.

After repeated use of the cutting mechanism of the present invention, the presently used cutting edge 66 of the insert blade 60 may become worn. Once the cutting edge 66 becomes worn, the insert blade 60 can be indexed such that one of the previously unused cutting edges 66 can be positioned upward such that the newly positioned cutting edge 66 functions to sever the elongated material during operation of the cutting mechanism 10. In this manner, the single insert blade 60 can be indexed such that each of the four individual cutting edges can be used as the blade becomes worn.

The rotation of the insert blade 60 about the support pin 52 is controlled by the retaining pin 49 extending into the blade receptacle 40, as shown in FIG. 6. The retaining pin 49 contacts the adjacent cutting edge 66 to prevent rotation of the insert blade 60 about the support pin 52.

Although the cutting mechanism 10 of the present invention has been described as being particularly useful in cutting fiber optic cable having a layer of Kevlar fiber, it is contemplated by the inventors that the cutting mechanism 10 could be particularly useful in cutting conventional wire, wire rope, or any other type of elongated material.

Various alternatives and embodiments are contemplated as being within the scope of the following claims particularly pointing out and distinctly claiming the subject matter regarded as the invention.

I claim:

1. A cutting mechanism operable for severing an elongated material comprising:

a blade housing having an attachment surface and a blade receptacle recessed from the attachment surface, the blade housing including a material-receiving opening extending therethrough and positioned adjacent to the blade receptacle for accommodating the elongated material;

an insert blade positioned in the blade receptacle of the blade housing, the insert blade having an outer face surface and at least one cutting edge positioned below the material-receiving opening;

a bias element positioned between the insert blade and the blade receptacle to urge the insert blade out of the blade receptacle and allow the insert blade to pivot about the bias element within the blade receptacle;

a guide block attached to the blade housing, the guide block including a recessed blade contact surface that defines a blade channel between the guide block and the blade housing;

a cutting blade received in the blade channel and reciprocably movable in the blade channel relative to the blade housing between a retracted position and an extended position, the cutting blade including a pair of guide legs spaced by an open channel and a cutting edge positioned to join the guide legs and terminate the open channel; wherein the bias element presses the outer face surface of the insert blade into contact with the guide legs of the cutting blade to align the cutting edge of the insert blade with the cutting edge of the cutting blade as the cutting blade moves from its retracted position to its extended position, whereby the bias element allows the insert blade to pivot within the blade receptacle to maintain contact between the outer face of the insert blade and the guide legs as the cutting edge of the insert blade moves toward and then past the cutting edge of the cutting blade to sever the elongated material extending through the material-receiving opening as the cutting blade moves from its retracted position to its extended position.

2. The cutting mechanism of claim 1 wherein the insert blade includes a plurality of cutting edges.

3. The cutting mechanism of claim 2 wherein the insert blade is indexable within the blade receptacle to selectively change the cutting edge of the insert blade positioned below the material-receiving opening.

4. The cutting mechanism of claim 3 wherein the insert blade is formed from carbide.

5. The cutting mechanism of claim 1 wherein both the insert blade and the cutting blade are formed from carbide.

6. The cutting mechanism of claim 1 wherein the guide block includes a pair of spaced attachment surfaces that contact the attachment surface of the blade housing and define the blade channel therebetween, each attachment surface including a recessed insert blade contact surface such that when the guide block is attached to the blade housing, the bias element urges the insert blade into contact with the insert blade contact surfaces such that an outer face surface of the insert blade extends past the attachment surface of the blade housing.

7. The cutting mechanism of claim 6 wherein the thickness of the cutting blade is less than the depth of the blade channel by an amount less than the depth of the insert blade contact surface such that when the cutting blade moves from its retracted position to its extended position, the outer face surface of the insert blade is supported solely on the guide legs of the cutting blade.

8. A cutting mechanism operable for severing an elongated material, such as fiber optic cable, comprising:

a stationary blade housing having an attachment surface and a blade receptacle recessed from the attachment surface, the blade housing including a material-receiving opening extending therethrough and positioned adjacent to the blade receptacle for accommodating the elongated material;

an indexable insert blade supported in the blade housing by a support pin, the insert blade having a generally planar outer face surface and a plurality of cutting edges such that the insert blade can be indexed about the support pin to position one of the cutting edges beneath the material-receiving opening of the blade housing;

a bias element surrounding the support pin and positioned between the insert blade and an inner surface of the blade receptacle to urge the insert blade away from the inner surface and allow the insert blade to pivot about the bias element within the blade receptacle;

a guide block attached to the blade housing, the guide block defining a blade channel when the guide block is attached to the blade housing;

a cutting blade reciprocably movable within the blade channel between a retracted position and an extended position, the cutting blade having a pair of spaced guide legs connected by a cutting edge, the guide legs being spaced by an open channel terminating at the cutting edge; wherein the bias element being operable to maintain contact between the outer face surface of the insert blade and the guide legs of the cutting blade to align the cutting edge of the insert blade with the cutting edge of the cutting blade as the cutting blade moves from the retracted position to the extended position such that the cutting edge of the insert blade positioned beneath the material-receiving opening and the cutting edge of the cutting blade sever the elongated material extending through the material-receiving opening as the cutting blade moves from its retracted position to its extended position.

9. The cutting mechanism of claim 8 wherein the insert blade is formed from tungsten carbide.

10. The cutting mechanism of claim 9 wherein the cutting blade is formed from tungsten carbide.

11. The cutting mechanism of claim 8 wherein the guide block includes a pair of spaced attachment surfaces that contact the attachment surface of the blade housing and define the blade channel therebetween, each attachment surface including a recessed insert blade contact surface such that when the guide block is attached to the blade housing, the bias element urges the insert blade into contact with the insert blade contact surfaces such that an outer face surface of the insert blade extends past the attachment surface of the blade housing.

12. The cutting mechanism of claim 8 wherein the bias element is a Belleville washer positioned between the insert blade and an inner face surface of the blade receptacle.

13. A cutting mechanism operable for severing an elongated material comprising:

a blade housing having an attachment surface and a blade receptacle recessed from the attachment surface, the blade housing including a material-receiving opening extending therethrough and positioned adjacent to the blade receptacle for accommodating the elongated material;

an insert blade positioned in the blade receptacle of the blade housing, the insert blade having an outer face surface and at least one cutting edge positioned below the material-receiving opening;

a bias element positioned between the insert blade and the blade receptacle to urge the insert blade out of the blade receptacle and allow the insert blade to pivot about the bias element within the blade receptacle, wherein the bias element is a Belleville washer positioned between the insert blade and an inner face surface of the blade receptacle;

a guide block attached to the blade housing, the guide block including a recessed blade contact surface that defines a blade channel between the guide block and the blade housing;

a cutting blade received in the blade channel and reciprocably movable in the blade channel relative to the blade housing between a retracted position and an extended position, the cutting blade including a pair of guide legs spaced by an open channel and a cutting edge positioned to join the guide legs and terminate the open channel; wherein the bias element presses the outer face surface of the insert blade into contact with the guide legs of the cutting blade to align the cutting edge of the insert blade with the cutting edge of the cutting blade as the cutting blade moves from its retracted position to its extended position, whereby the bias element allows the insert blade to pivot within the blade receptacle to maintain contact between the outer face of the insert blade and the guide legs as the cutting edge of the insert blade moves toward and then past cutting edge of the cutting blade to sever the elongated material extending through the material-receiving opening as the cutting blade moves from its retracted position to its extended position.

14. A cutting mechanism operable for severing an elongated material comprising:

a blade housing having an attachment surface and a blade receptacle recessed from the attachment surface, the blade housing including a material-receiving opening extending therethrough and positioned adjacent to the blade receptacle for accommodating the elongated material;

an insert blade positioned in the blade receptacle of the blade housing, the insert blade having an outer face surface and a plurality of cutting edges, wherein at least one cutting edge is positioned below the material-receiving opening;

a bias element positioned between the insert blade and the blade receptacle to urge the insert blade out of the blade receptacle and allow the insert blade to pivot about the bias element within the blade receptacle;

a guide block attached to the blade housing, the guide block including a recessed blade contact surface that defines a blade channel between the guide block and the blade housing;

a cutting blade received in the blade channel and reciprocably movable in the blade channel relative to the blade housing between a retracted position and an extended position, the cutting blade including a pair of guide legs spaced by an open channel and a cutting edge positioned to join the guide legs and terminate the open channel; and a support pin extending through the blade housing and the insert blade to support the insert blade within the blade receptacle, the insert blade being selectively rotatable about the support pin to change the cutting edge of the insert blade that is positioned beneath the material-receiving opening formed in the blade housing; wherein the bias element presses the outer face surface of the insert blade into contact with the guide legs of the cutting blade to align the cutting edge of the insert blade with the cutting edge of the cutting blade as the cutting blade moves from its retracted position to its extended position, whereby the bias element allows the insert blade to pivot within the blade receptacle to maintain contact between the outer face of the insert blade and the guide legs as the cutting edge of the insert blade moves toward and then past the cutting edge of the cutting blade to sever the elongated material extending through the material-receiving opening as the cutting blade moves from its retracted position to its extended position.

* * * * *